United States Patent [19]

Barnes et al.

[11] 4,115,983
[45] Sep. 26, 1978

[54] ROW-CROP HARVESTING HEADER

[75] Inventors: Theodore Marion Barnes; Joseph John Shindelar; Merlyn Duane Bass; Henry William Suechting, Jr., all of Ottumwa, Iowa

[73] Assignee: Deere & Company, Moline, Ill.

[21] Appl. No.: 498,781

[22] Filed: Aug. 19, 1974

[51] Int. Cl.² .......................................... A01D 45/02
[52] U.S. Cl. .......................................... 56/98; 56/111
[58] Field of Search .......... 56/14.3, 14.5, 98, 103–106, 56/108, 111, 112, 117, 119; 171/61, 62

[56] References Cited

U.S. PATENT DOCUMENTS

| 3,271,940 | 9/1966 | Ashton et al. | 56/105 |
| 3,339,354 | 9/1967 | Kessler | 56/98 |
| 3,585,789 | 6/1971 | Blanshine et al. | 56/98 |
| 3,791,117 | 2/1974 | Lawrence | 56/98 |
| 3,796,029 | 3/1974 | Weigand et al. | 56/119 |
| 3,807,152 | 4/1974 | Storm et al. | 56/98 |
| 3,808,783 | 5/1974 | Sutherland et al. | 56/106 |

Primary Examiner—Louis G. Mancene
Assistant Examiner—Paul J. Hirsch

[57] ABSTRACT

A self-propelled forage harvester has a forward transversely elongated header that includes a plurality of row units mounted on the header frame for removing crop material from a plurality of rows as the machine advances and delivering it rearwardly to a transverse auger on the header, which converges the crop and delivers it rearwardly to the forage harvester through a central crop transfer opening in the header. Each row unit includes a supporting structure extending forwardly in cantilever fashion from the header frame and a pair of belt type gathering elements having opposite rearwardly moving inner runs with intermeshing projections that clamp the stalks of row planted crops to move the stalk rearwardly. A reciprocating cutter is mounted on the supporting structure below the forward intake ends of each pair of gathering elements and the rearward discharge end of each pair gathering elements is disposed directly under the auger to positively feed the butt of the severed stalk under the auger. The row units are laterally shiftable to accommodate different row spacings, and crop dividers are mounted on the row units and extend between adjacent row units, outer dividers being provided at the opposite sides of the header. A pair of upright, driven rollers are mounted at the rearward ends of the outer two dividers in front of the sides of the header frame to facilitate feeding of the crop past the front edges of the header sides, and an upper stalk control structure is mounted on the frame and includes a transverse member forwardly and above the auger for engaging the upper portion of upright stalks so that the stalks are fed under the auger.

24 Claims, 8 Drawing Figures

ROW-CROP HARVESTING HEADER

BACKGROUND OF THE INVENTION

This invention relates to a row-crop harvesting header and more particularly to a multi-row header for a forage harvester or the like.

It is known to provide harvesting attachments or headers for forage harvesters for removing row planted crops from the field and delivering it to the forage harvester, although heretofore most row-crop headers have been capable of harvesting only one or two rows of crop material at a time. However, with the increasing capacity of forage harvesters, and the overall trend toward larger machines, a need for larger headers has arisen, and it is known to provide headers that are capable of harvesting three rows of row planted crops in each pass. Generally headers of this type utilized rearwardly converging crop gathering means for conveying the crop material to the relatively narrow forage harvester feed opening. However, space limitations at the rearward end of the header have presented a problem for converging the three row gathering system, and it would be extremely difficult to accommodate more than three rows utilizing the conventional forage harvester row-crop header concepts. With the trend toward still larger machines, a need has arisen for headers capable of harvesting more than three rows of crops. This need has become more acute with the increasing use of corn stover as a livestock feed, it being desirable to harvest more than three rows of stover at one pass through the field to utilize the full capacity of the harvester, since a much smaller amount of crop material is available in each row when harvesting stover than in the more conventional forage crops, such as whole plant corn.

It is also known to provide row-crop attachments for combine harvesting platforms, wherein the row-crop units deliver the crop to the combine cutter bar which servers it from the field, the crop moving directly rearwardly to a conventional auger which converges the crop and delivers it rearwardly to the separating mechanism in the combine, such an attachment being shown in U.S. patent 3,201,928. It is further known to provide individual row units that utilize separate cutting mechanism on each row unit and also utilize a pair of belts for grasping the butt of the severed crop and delivering it rearwardly through a transverse auger, such a header being shown in U.S. Pat. No. 3,808,783, although the header disclosed in said patent is primarily for row-crops such as soybeans and was not designed for use with a forage harvester that harvests row-crops such as whole plant corn.

SUMMARY OF THE INVENTION

According to the present invention, there is provided an improved row-crop harvesting header for removing a plurality of rows of crop material from the field. More specifically, the invention features the provision of a plurality of row units with each row unit having a pair of endless flexible gathering elements that grasp the crop between the opposite rearwardly moving runs of the elements as it is severed from the field, the gathering elements delivering the crop to a transverse auger, which converges the crop along the floor of the header and discharges it rearwardly to a forage harvester or the like.

An important feature of the invention resides in the relationship between the rearward discharge end of the gathering elements and the auger, so that the butt end of the severed crop is positively fed under the auger.

Another feature of the invention resides in the provision for lateral adjustment of the individual row units to accommodate different row spacings.

Still another feature of the invention resides in the construction of the individual row units, wherein each row unit includes a supporting structure mounted on and extending forwardly from a transverse beam on the header frame in cantilevered fashion. Further, each supporting structure includes a cast housing that is connected to the transverse beam and journals the drive shafts for the gathering belts and the input shaft for the row unit, the input shaft being connected the drive shafts by gear means to provide a compact drive system with the housing forming an integral part of the row unit supporting structure.

Still another feature of the invention resides in the provision of driven upright rollers at opposite sides of the platform above the outer dividers to facilitate feeding of crop material that might be draped over the dividers.

Still another feature of the invention resides in the provision of an upper stalk control structure for guiding the upper ends of tall upright crops, such as corn and the like, so that the crop stalks are fed butt first under the auger.

DESCRIPTION OF THE PREFERRED EMBODIMENT

Figure 1:
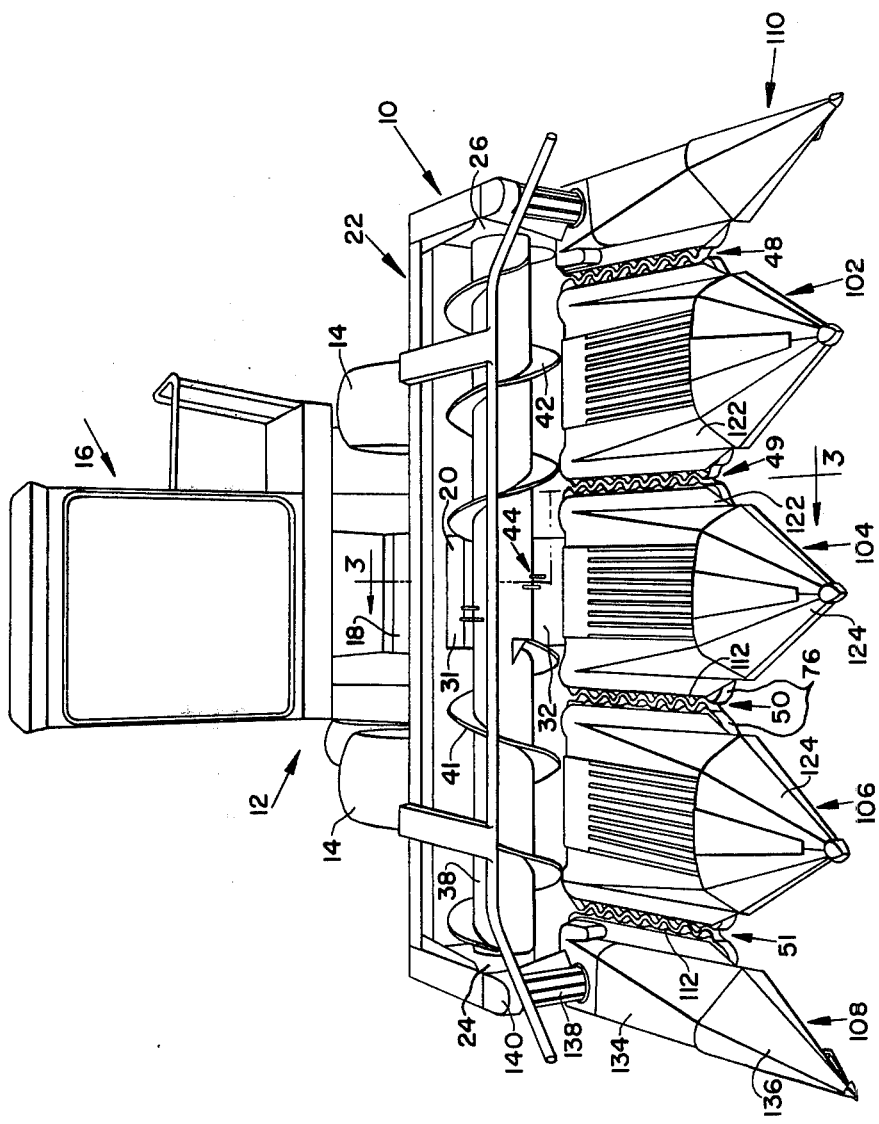
FIG. 1 is a front perspective view of the improved header mounted on a self-propelled forage harvester.
Figure 2:
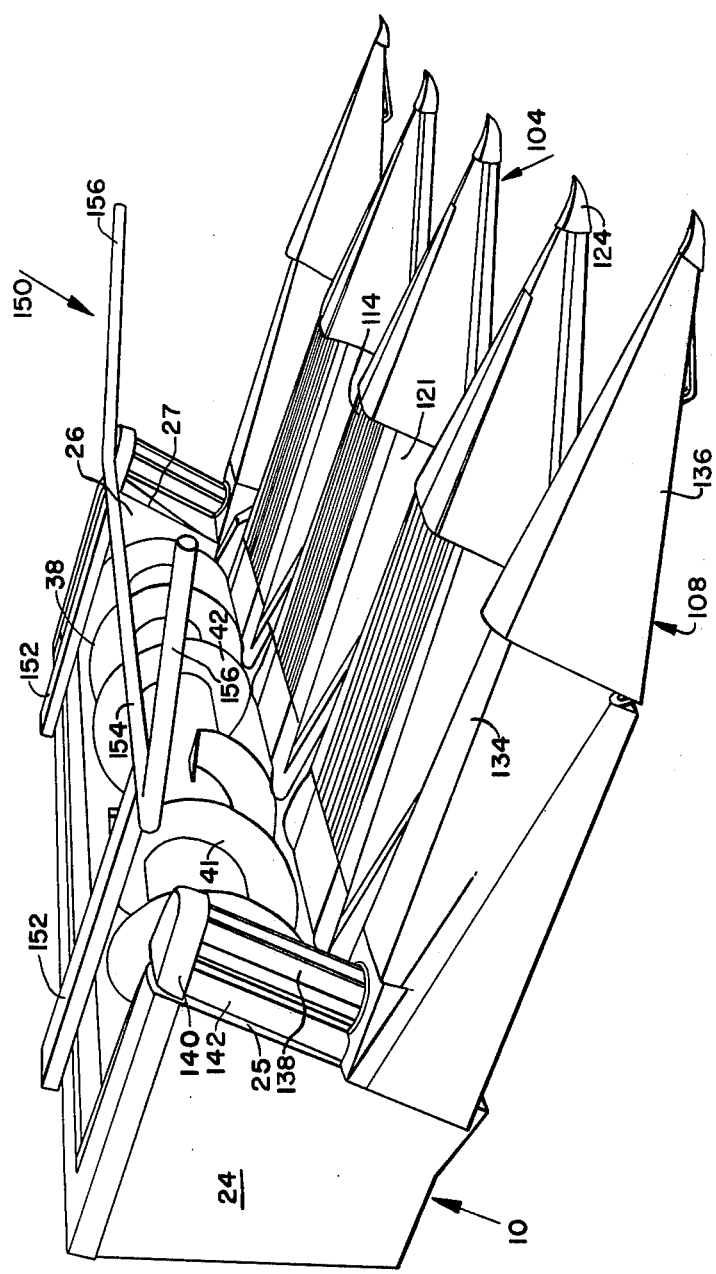
FIG. 2 is a right front perspective of the header alone.

The invention is embodied in a row crop harvesting header 10 that is carried in front of a self-propelled forage harvester 12. The harvester 12 will not be described in detail except to note that it is mounted on a pair of forward drive wheels 14 and includes an elevated cab 16 above a cutterhead housing 18, which houses a reel type cutter head and feed rolls for moving crop material rearwardly from a forward inlet 20 of the cutter head housing.

The header 10 includes a rigid frame, indicated generally by the numeral 22. The frame includes an upright right side 24 having an upwardly and forwardly inclined front edge 25 and a left side 26 having an upwardly and forwardly inclined front edge 27. A floor 28 extends between the opposite sides 24 and 26 and is inclined downwardly and forwardly at approximately 30° from the horizontal, and a generally upright rear wall 30 spans the width of the header between the opposite sides and extends upwardly from the floor, the rear wall being provided with a central crop transfer opening 31 that conforms to and communicates with the forage harvester inlet 20. The floor is provided with a depressed area or well 32 immediately in front of the crop transfer opening 31.

The header frame includes a transverse upper rear beam 33 extending between the opposite sides above the rear wall and a transverse lower beam 34 that also extends between the opposite sides immediately below the forward end of the floor, the forward side of the beam being generally aligned with the inclined front edges 25 and 26 of the opposite frame sides. A pair of upright beams 35 are disposed on the rear side of the rear wall 30 on opposite sides of the crop transfer opening 31, and conventional upper and lower attaching brackets 36 and 37, respectively, are mounted on each upright beam and provide means for connecting the header to the basic forage harvester 12.

Figure 3:
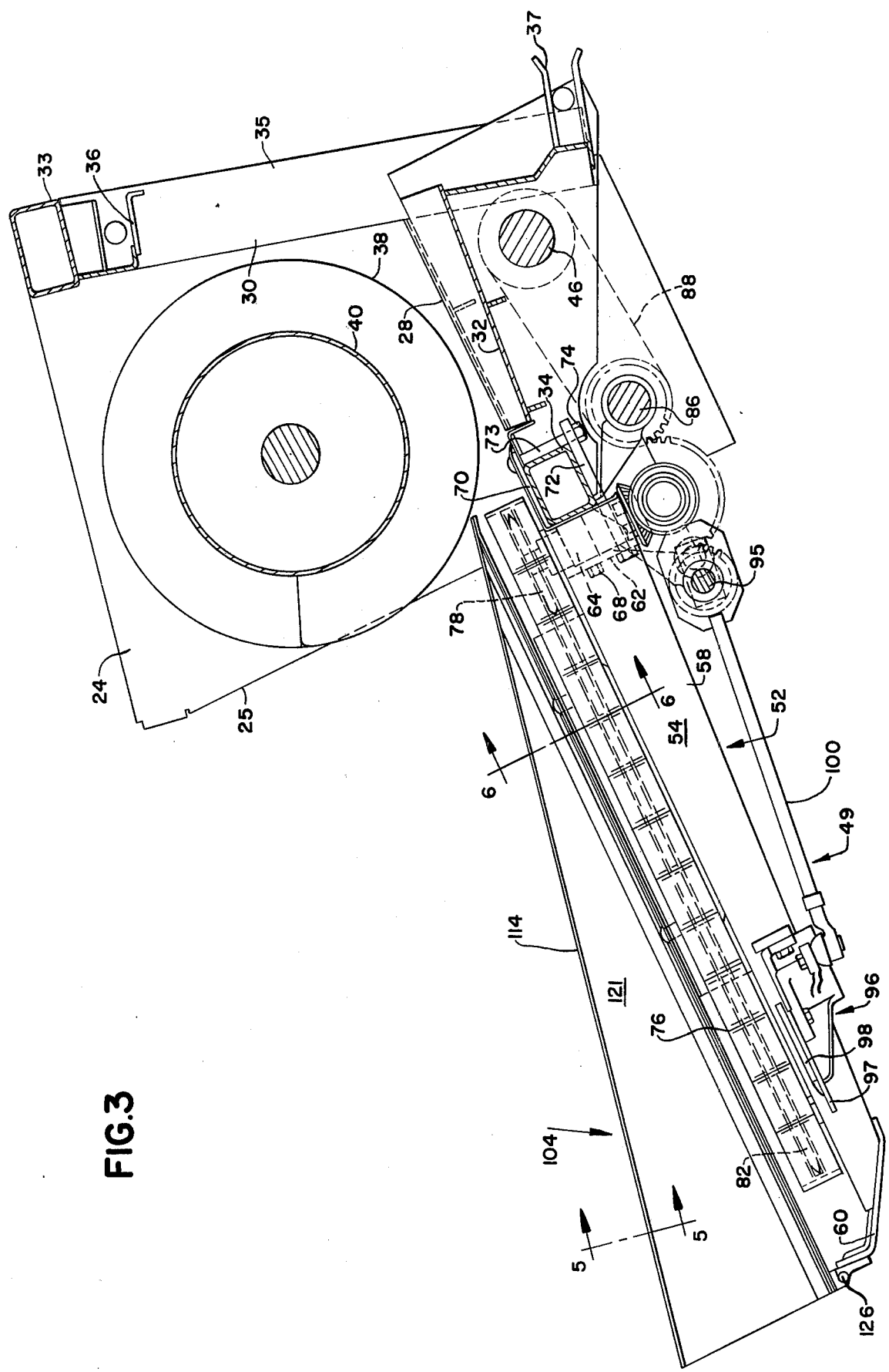
FIG. 3 is an enlarged vertical fore and aft section viewed along the line 3—3 of FIG. 1 and the line 3—3 of FIG. 6, with front divider points being removed and with some of the components being schematically shown.

A transverse horizontal auger 38 extends between the opposite sides 24 and 26 immediately above the floor 28 and forwardly of the rear wall 30. The auger includes an axial tube 40 and oppositely wound right and left flights 41 and 42, respectively, extending from the opposite ends of the auger to the center of the auger immediately in front of the crop transfer opening. A disappearing finger type conveying mechanism 44 is mounted in the auger tube immediately in front of the crop transfer opening and at the inner discharge ends of the opposite auger flights, the disappearing finger type conveying mechanism being of well known construction and being operative to discharge the crop rearwardly through the crop transfer opening after the crop is converged to the center of the header by the auger. The auger is rotated in a counterclockwise direction, as viewed in FIG. 3, and is driven by a conventional drive (not shown) on the side of the header from a transverse drive shaft 46, which spans the width of the header immediately below the rearward end of the floor. The drive shaft is driven from the forage harvester by a chain drive that is selectively disconnectable to permit removal of the header in the known manner.

Mounted on the header frame are four laterally spaced row units 48, 49, 50 and 51. Of course, the present invention is not limited to a four row unit, and the concepts employed herein can be utilized by headers having fewer or more row units. The row units are substantially identical and therefore only one row unit will be described in detail, the row units 49 being shown in greater detail in FIG. 3.

The row unit includes a generally fore and aft downwardly and forwardly inclined supporting structure 52 mounted on and extending forwardly from the transverse beam 34 in cantilever fashion. The supporting structure includes an inverted channel shaped member 54 having a flat center portion 56 that substantially spans the width of the row unit and extends downwardly and forwardly from the beam toward the ground when the machine is in operating condition. The member 54 also includes upright legs 57 and 58 that depend from the opposite sides of the member center portion 56, and a ground engaging skid 60 is mounted on and extending forwardly from the forward end of each leg 57 and 58. An upright transverse rear plate 62 is welded to the channel shaped member adjacent to its rearward end and extends between the opposite legs 57 and 58.

A cast housing 64 includes an upper portion 66 that has flat opposite front and rear walls. The housing upper portion 66 is bolted to the rear side of the plate 62 by bolts 68, the flat upper housing portion 66 seating against the flat plate. The flat rear side of the upper housing portion 66 abuts the forward side of the transverse beam 34, and the channel member 54 includes a top extension 70 that overlies and seats against the top of the beam 34. A pair of eye bolts 72 extend rearwardly through the plate 62 and seat against the bottom of the beam 34, and generally vertical bolts 73 extend downwardly through the extension 70 and through the eyes of bolts 72 and are secured therein by nuts 74. As is apparent from FIG. 3, the bolts 73 seat against the rear side of the beam 34, and tightening the nuts 74 clamps the housing and the supporting structure 52 to the beam. The supporting structure can be adjusted along the beam by merely loosening the nuts 74 and sliding the supporting structure along the beam, after which the nuts are tightened to lock the supporting structure to the beam.

Each row unit includes a pair of endless flexible gathering elements 76 respectively trained around a pair of laterally spaced rear sprockets 78 mounted on the upper ends of generally upright shafts 80 journaled in and extending through the upper housing portion 66. The gathering elements are also trained around a pair of laterally spaced front sprockets 82 rotatably supported on the channel shaped member 54 adjacent the forward end of the member. The construction of the gathering elements is described in greater detail in U.S. Pat. No. 3,339,354, also assigned to the assignee herein, and as is now well known, each gathering unit includes a chain trained around the front and a rear sprocket and a sinuous belt attached to the exterior side of the chain, the loops formed by the sinuous belts disappearing as the chain moves around the front and rear sprockets. As is also well known, the inner runs of the adjacent gathering elements are relatively closely spaced so that the loops along the inner run of the opposite gathering elements intermesh, the butt end of the stalks engaged by the row unit being clasped between the intermeshing belt loops.

A transverse input shaft 86 is journaled in a lower housing portion 87 of each housing 64 and is disposed generally below the beam 34. Preferably, two shafts 86 are provided on the header, one extending inwardly from each side, so that the left hand shaft drives the row units 48 and 49, while the right hand shaft drives the row units 50 and 51, the shafts extending through the housings for the outer row units and terminating at the inner row unit. The input shafts 86 are driven by the transverse drive shaft 46 by conventional drives at the opposite ends of the header, a drive being schematically shown in FIG. 3 and indicated by the numeral 88. A slip clutch 89 of conventional construction is provided in the input shaft 86 immediately in advance of each row unit to protect the row unit components, and means are provided in the input shafts for accommodating lateral adjustment of the row units to accommodate different row spacings, such means for adjusting the length of the shaft between adjacent row units being well known and not shown herein.

1. A row crop harvesting header for a mobile harvesting machine for removing a plurality of rows of row planted crop material from a field as the machine advances and comprising: a header frame having opposite sides and a floor extending between the opposite sides; a transverse auger extending between the opposite sides above the floor for moving crop material laterally along the floor and including an axial auger tube and auger flighting wound around the tube; a plurality of generally fore and aft extending divider members mounted on the header frame and defining a plurality of generally fore and aft passageways between adjacent divider members, each passageway being adapted to receive the crop material growing in a row as the machine advances; a crop gathering means supported on the frame adjacent each passageway and including a pair of endless flexible gathering elements respectively disposed on opposite sides of the passageway, each pair of gathering elements having opposite, fore and aft extending, inner runs moving rearwardly along the passageway and operative to engage the crop material in the passageway and move it rearwardly to the auger, the rearward, discharge ends of each pair of endless flexible gathering elements being disposed above and adjacent to the forward end of the floor and directly below the front side of the auger tube; and cutting means below and adjacent to the forward intake end of each pair of gathering elements for severing the crop material from the field as it is engaged by the gathering element.

2. The invention defined in claim 1 wherein the lower edges of the endless flexible gathering elements extend generally tangentially from the lower periphery of the auger flighting.

3. The invention defined in claim 2 wherein the floor includes a forward portion inclined downwardly and forwardly, and the gathering elements are inclined downwardly and forwardly at approximately the same angle on the floor, the lower edges of the gathering elements being substantially coplaner with the floor.

4. The invention defined in claim 3 wherein the header includes a central rearward crop transfer opening and the floor includes a recessed area below the auger and immediately in front of the discharge opening to increase the space below the center of the auger where the crop material accumulates prior to rearward discharge through the crop transfer opening.

5. The invention defined in claim 4 wherein the platform frame includes a transverse beam below a forward portion of the floor, and each gathering means includes a supporting structure and a pair of front and rear sprockets mounted on the supporting structure, each gathering element being trained around a front and a rear sprocket and each supporting structure being mounted in cantilever fashion on the transverse beam and extending forwardly therefrom, at least one of the supporting structures being mounted for selective lateral adjustment on the transverse beam to vary the spacing between adjacent gathering means.

6. The invention defined in claim 1 wherein the opposite sides of the header frame include generally upright forward edges and the divider members include a pair of outer divider members respectively extending forwardly from the opposite sides of the header frame and having top surfaces forwardly on the forward edges of the header frame sides, and including a pair of generally upright rollers respectively mounted on the outer divider members and extending upwardly from the top suraces forwardly of the forward edges of the frame sides.

7. The invention defined in claim 6 wherein the outer divider members are mounted on the frame for selective lateral adjustment and the roller are laterally shiftable with the outer divider members.

8. The inventioned defined in claim 1 wherein the header includes a central rearward crop transfer opening and the floor includes a recessed area below the auger and immediately in front of the discharge opening to increase the space below the center of the auger where the crop material accumulates prior to rearward discharge through the crop transfer opening.

9. The invention defined in claim 1 wherein the platform frame includes a transverse beam below a forward portion of the floor, and each gathering means includes a supporting structure and a pair of front and rear sprockets mounted on the supporting structure, each gathering element being trained around a front and a rear sprocket and each supporting structure being mounted in cantilever fashion on the transverse beam and extending forwardly therefrom, at least one of the supporting structures being mounted for selective lateral adjustment on the transverse beam to vary the spacing between adjacent gathering means.

10. The invention defined in claim 9 wherein each supporting structure includes a unitary housing having an input shaft connected to and driven by a transverse drive shaft on the header, a pair of output shafts respectively drivingly connected to and coaxial with the rear sprockets mounted on the supporting structure, and gear means drivingly connecting the input shaft to the output shafts.

11. The invention defined in claim 10 where the divider members include a pair of outer divider members at opposite sides of the header and inner divider members disposed between the outer divider members, each inner divider member overlying and being supported on adjacent supporting structures and including a pair of spaced top panels respectively attached to and laterally shiftable with the adjacent supporting structures and a center panel removably connected to the top panels in alternate positions and spanning the space between the top panels, regardless of the adjusted position of the panels.

12. The invention defined in claim 11 wherein the adjacent supporting structures and the top panels of an inner divider member mounted thereon are laterally adjustable in predetermined increments to vary the spacing between adjacent gathering means in said increments, and the top panels have a plurality of fore and aft ribs, laterally spaced at said increments, that mesh with fore and aft ribs on the center panel that are laterally spaced at the same increments, so that different ribs on the top panels mesh with different ribs on the center panel at different spacings between the adjacent pairs of gathering means.

13. The invention defined in claim 1 and including an upper stalk control structure mounted on the header frame and including a transverse member forwardly of and above the auger and having opposite ends spaced inwardly of the opposite sides of the header, and a pair of forwardly, diverging arms extending forwardly from the opposite ends of the transverse member generally above the outer divider members, the transverse member engaging the upper portion of tall upright crop material as it is moved rearwardly by the gathering means before it is released by the gathering elements.

A spur gear 90 is provided on the input shaft 86 adjacent the housing and meshes with a gear 91 on a countershaft 92 journaled in the housing parallel to the input shaft 86. Two pair of bevel gears 93 drivingly connect the countershaft 92 to the vertical shafts 80 for the rear sprockets to rotate the rear sprockets in opposite directions, so that the opposite inner runs of the gathering elements move rearwardly. A third spur gear 94 is driven by the gear 91 and is mounted on a transverse shaft 95 also journaled in the lower housing portion 87 forwardly of the countershaft 92. the shafts 95, 92, and 86 lying in substantially the same plane below the channel shaped member 54.

A cutting mechanism 96 is provided on the row unit below and adjacent to the forward ends of the gathering elements, the cutting mechanism including a pair of forwardly diverging stationary blades and an oscillating knife 98 that is driven from the shaft 95 through a Pittman type drive 100, the above being more or less well known construction and also being shown in said U.S. Pat. No. 3,339,354. As is apparent, the center portion of the channel shaped member has an opening which permits the movement of crops rearwardly to the cutting mechanism, which severs the crop from the field as it is engaged by the forward ends of the gathering elements, the butt end of the severed stalk of crop material moving upwardly and rearwardly along the top of the channel shaped member.

Three hood like center dividers 102, 104 and 106 cover the space between adjacent row units, the divider 102 extending between row units 48 and 49, the divider 104 extending between units 49 and 50 and the divider 106 extending between units 50 and 51, each divider being supported on adjacent row units. A pair of outer dividers 108 and 110, respectively, extend forwardly from the opposite sides of the header and are supported on the outer row units 48 and 51. As is apparent, the dividers are transversely spaced and form for fore and aft passageways 112, and the inner runs of the gathering elements 76 of the four row units are disposed along opposite sides of the passageway.

The three center dividers 102, 104 and 106 are identical and therefore only the divider 104 will be described in detail. The divider includes a hood-like rear portion 119 made up of a downwardly and forwardly inclined top panel 114 and side panels 116 and 118. Each side panel includes a top portion 120 that overlaps the top panel 114, an inclined portion 121 at the side of the divider, and an outwardly extending lip that closely overlies the gathering element. The passageway 112 is formed between the outer edges of the lips of the adjacent dividers. The top panel is inclined upwardly and rearwardly at a lesser angle than the gathering elements, so that the inclined portions 120 and 121 are trianguler in shape. Each divider also includes a divider point or forward portion 124 that is free to float vertically relative to the remainder of the divider as is well know, the forward portion 124 converging to a point that is normally positioned between the rows. Each divider side panel is mounted on the adjacent row unit supporting structure 52 by means of a transverse pivot 126 at the forward end of the skid 60, permitting the divider to be swung upwardly to expose the gathering elements. The rearward end of the divider is supported above the gathering elements by a bracket (not shown).

Figure 5:
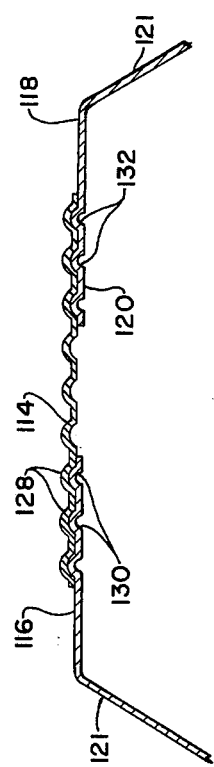
FIG. 5 is a vertical section through the top panel of one of the divider members as viewed along the line 5—5 of FIG. 3.
Figure 6:
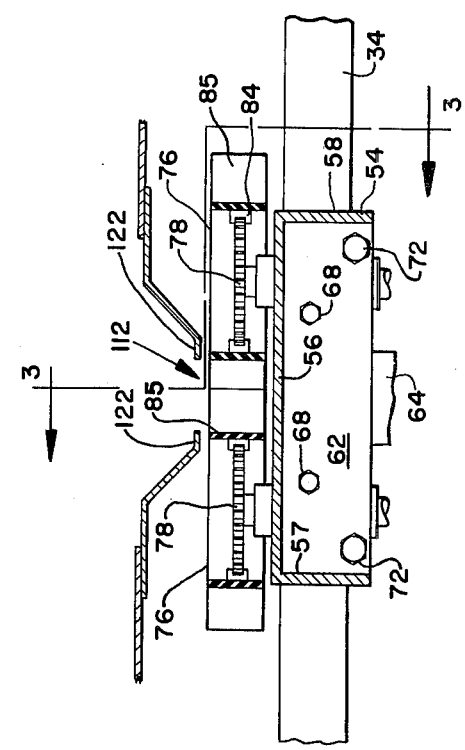
FIG. 6 is a schematic vertical section through one of the row units as viewed generally along the line 6—6 of FIG. 3.

As best seen in FIG. 5, the divider top panel 114 is provided with a number of fore and aft, equally spaced ribs 128, and the side panels 116 and 118 are provided with similar, equally spaced ribs 130 and 132 respectively. The top panel 114 is attached to the side panels by removable fasteners (not shown), and the spacing between the ribs conforms to the increments at which the row units are adjusted to different spacings. Since the side panels 116 and 118 are attached to different row units, when the spacing between row units is adjusted, the divider top panel 114 is loosened to permit lateral adjustment of the side panels 116 and 118 relative to one another, the ribs 128 meshing with the ribs 130 and 132 in the different adjusted positions of the row units. The ribs also provide additional strength for the top of the dividers.

Figure 4:
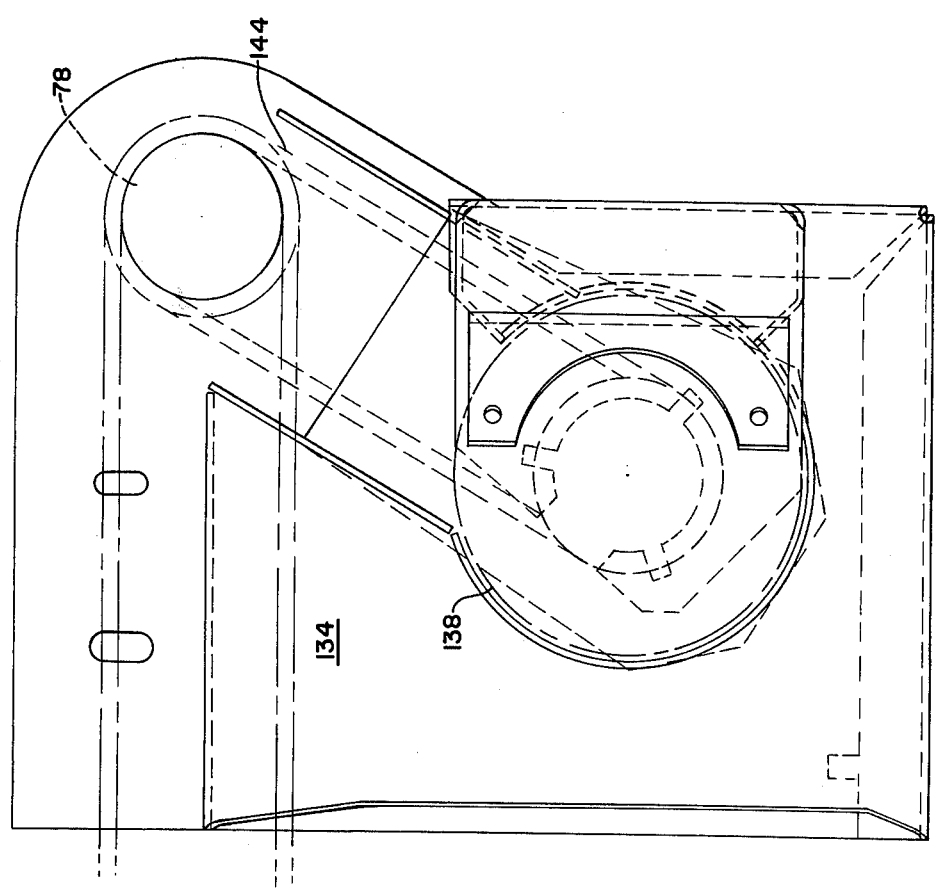
FIG. 4 is an enlarged plan view of the rearward portion of the outer right divider, showing the mounting of the upright roll and schematically showing the drive for the row.
Figure 8:
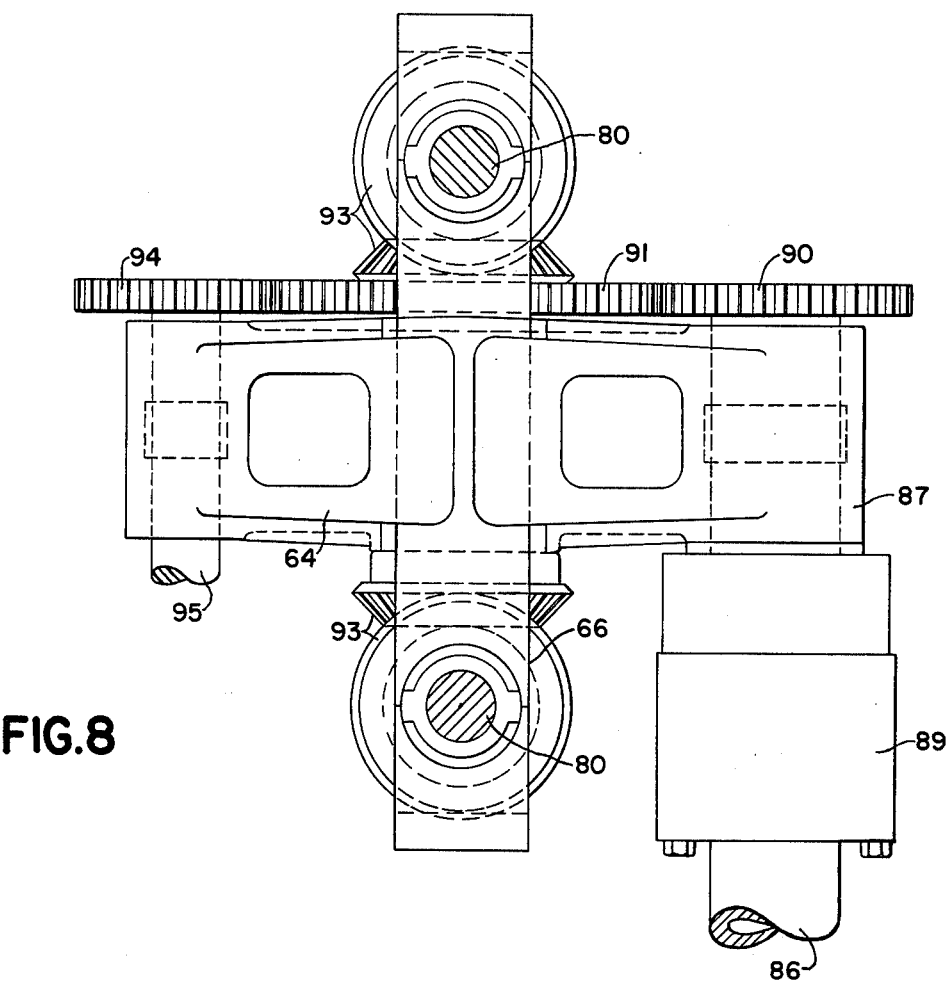
FIG. 8 is a plan view of the drive as viewed along the line 8—8 of FIG. 7.
Figure 7:
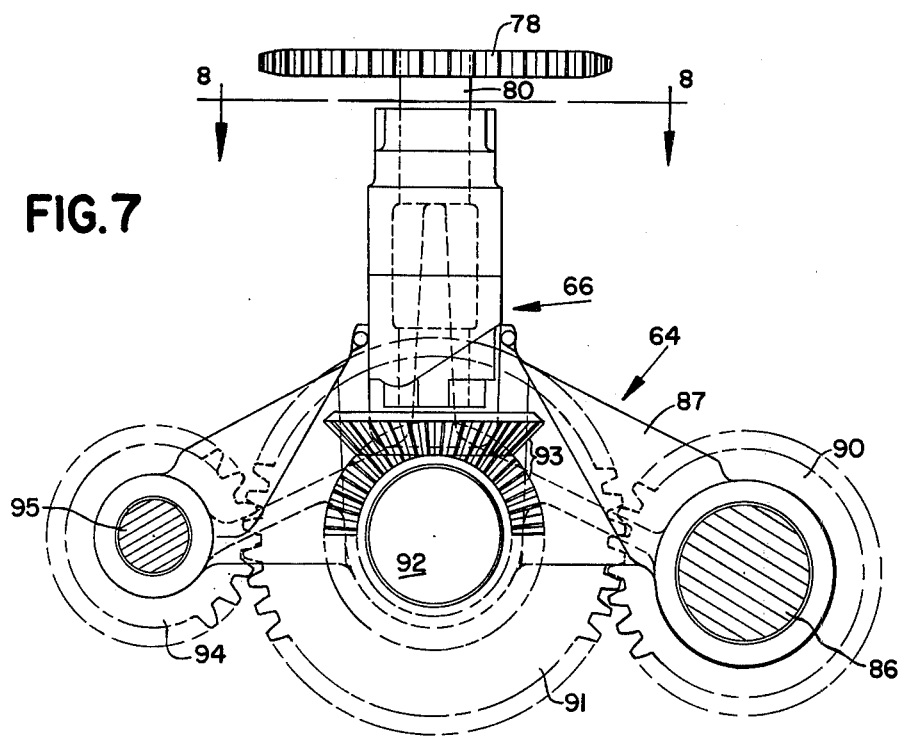
FIG. 7 is an enlarged side elevation view of the drive for the rear gathering sprockets.

The outer dividers 108 and 110 are mirror images of one another and each includes a top surface 134 lying in the same plane as the top of the center dividers. The outer dividers are pivotally mounted on the row unit supporting structure in the same manner as the inner dividers, and are similarly provided with a floating divider point 136. A fluted roller 138 extends upwardly from the rearward end of the outer divider top surface immediately in front of the front edge of the header side. The lower end of the roller is supported on the outer row unit so that the roller shifts laterally with the row unit, the outer divider also shifting with a row unit. The upper end of the roller is journaled in a cap 140 that is connected to the outer divider by a vertical member 142 encompassing the rearward portion of the roller. The rollers 138 are driven from the outer rear sprocket 78 of the outer row unit by a chain type drive 144, which is schematically shown in FIG. 4.

An upper stalk control, indicated generally by the numeral 150 is provided to control the tops of tall stalk crops such as corn, the upper portions of the stalks engaging the stalk control 150 as the lower end of the stalk is fed under the auger, so that the stalk is fed butt first under the auger. The upper stalk control 150 includes a pair of fore and aft supports 152 having their rearward end attached to the upper rear frame beam 33. A transverse tubuler member 154 is mounted on the forward ends of the supports 152 and is disposed above and forwardly of the auger, and a pair of forwardly diverging arms 156 extend forwardly and horizontally from the opposite ends of the transverse member 154. The forward ends of the arms 156 terminate above the outer dividers 108 and 110.

In operation, the forage harvester advances through a field of row crop planted crop, and the harvester is driven so that the crop rows are aligned with the passageways 112 of the four row units. The dividers separate the crop from the adjacent rows and direct the crop into the passageways, where the lower end of the stalk of the crop is engaged by the gathering elements 76. The stalk is then severed from the ground by the cutting mechanism 96, and the butt of the stalk is moved rearwardly by the gathering elements 76 and positively fed under the auger 38, the upper stalk control preventing the upper portion of the stalks from falling on top of the auger. The auger then converges the crop material to the center of the header, where it is discharged rearwardly through the crop transfer opening 131 to the forage harvester cutter head. The well or recess 32 in the center of the header in front of the opening 131 increases the space below the center of the auger and prevents the bunching of material at the crop transfer opening.

We claim:

14. A row crop harvesting header for a mobile harvesting machine for removing a plurality of rows of row planted crop material from a field as the machine advances and comprising: a header frame having opposite sides and a floor extending between the opposite sides; a transverse auger extending between the opposite sides above the floor for moving crop material laterally along the floor and including an axial auger tube and auger flighting wound around the tube; a plurality of transversely spaced row units mounted on the header frame and extending forwardly therefrom, each row unit including a supporting structure, pairs of transversely spaced front and rear sprockets mounted on the supporting structure and a pair of endless flexible gathering elements, each gathering element being trained around a front and a rear sprocket, the gathering elements including opposite, generally fore and aft inner runs with intermeshing projections, drive means operatively connected to the rear sprockets for driving the inner runs rearwardly so that crop material engaged between the inner runs moves rearwardly to a discharge point rearwardly of the rear sprockets, and below the level of the auger tube, the gathering elements having lower edges lying in a downwardly and forwardly inclined plane extending generally tangentially from the auger periphery.

15. The invention defined in claim 14 wherein the header floor includes a downwardly and forwardly inclined forward portion below the auger and in general alignment with the lower edges of the gathering elements.

16. The invention defined in claim 15 wherein the header includes a central, rearward crop transfer opening and the floor includes a recessed portion below the auger and forwardly of the crop transfer opening.

17. The invention defined in claim 14 and including a plurality of transversely spaced, generally fore and aft crop divider members defining fore and aft passageways above the inner, rearwardly moving runs of each row unit, the inner divider members overlying adjacent row units and the outer divider members overlying only the outer portions of the outer row units.

18. The invention defined in claim 17 and including an upper stalk control structure mounted on the header frame and including a transverse member forwardly of and above the auger and having opposite ends spaced inwardly of the opposite sides of the header, and a pair of forwardly, diverging arms extending forwardly from the opposite ends of the transverse member generally above the outer divider members, the transverse member engaging the upper portion of tall upright crop material as it is moved rearwardly by the gathering means before it is released by the gathering elements.

19. A row crop harvesting header for a mobile harvesting machine for moving a plurality of rows of row planted crop material as the machine advances and comprising: a header frame having opposite sides, a rear wall with a central discharge opening, and a floor extending between the opposite sides forwardly of the rear wall and including a forwardly and downwardly inclined forward portion and a central recessed portion below the level of the inclined portion and immediately in front of the crop transfer opening; a transverse auger extending between the opposite sides immediately above the inclined portion of the floor and including an axial tube and oppositely wound auger flighting at opposite ends of the auger for converging crop material along the floor of to central recessed portion of the floor the inclined forward portion substantially underlying the auger tube; means associated with the auger for discharging crop material from the recessed portion rearwardly through the rear crop transfer opening; a plurality of transversely spaced row units mounted on the header frame and extending forwardly therefrom, each row unit including a pair of endless flexible gathering elements having opposite, transversely spaced inner runs; drive means operatively connected to the gathering elements for driving the inner runs rearwardly so that crop material enngaged between the inner runs moves rearwardly to a discharge point at the forward edge of the inclined portion of the floor; and cutting means below and adjacent to the forward intake end of each pair of gathering elements for severing the crop material from the field as it is engaged by the gathering element.

20. The invention defined in claim 19 wherein the gathering elements are inclined downwardly and forwardly at approximately the same angle as the inclination of the inclined portion of the floor, the rearward discharge end of the gathering elements being disposed below the level of the auger tube.

21. A row crop harvesting header for a mobile harvesting machine for removing a plurality of rows of row planted rop material from a field as the machine advances and comprising: a header frame having opposite sides and a floor extending between the opposite sides; a transverse auger extending between the opposite sides above the floor for moving crop material laterally along the floor and including an axial auger tube and auger flighting wound around the tube; a plurality of generally fore and aft extending divider members mounted on the header frame, including a pair of outer divider members at opposite sides of the machine, said divider members defining a plurality of generally fore and aft passageways between adjacent divider members, each passageway being adapted to receive the crop material growing in a row as the machine advances; a crop gathering means supported on the frame adjacent each passageway and including a supporting structure mounted on and extending forwardly from the frame and a pair of endless flexible gathering elements respectively mounted on the supporting structure and disposed at opposite sides of the passageways, each pair of gathering elements having opposite fore and aft extending inner runs moving rearwardly along the passageway and adapted to engage the crop material and move it rearwardly to the auger, the outer divider members being respectively mounted on the supporting structures of the outer gathering means and the outer gathering means being mounted for selective lateral adjustment on the frame to vary the distance between adjacent gathering means to accommodate different row spacings, the outer divider members respectively extending forwardly from the opposite sides of the header frame and having top surfaces forwardly of the header frame sides; a pair of generally upright rollers respectively mounted on and extending upwardly from the supporting structures of the outer gathering means and extending upwardly from the top surface of the outer divider members forwardly of the opposite sides of the header frame, the rollers being laterally adjustable with the outer gathering means.

22. The invention defined in claim 21 wherein each pair of endless flexible gathering elements is trained around a pair of rear sprockets mounted on the supporting structure below the auger, the rearward end of the flexible gathering elements being disposed directly below the auger tube.

23. A row crop harvesting header for a mobile harvesting machine for removing a plurality or rows of row planted crop material from a field as the machine advances and comprising: a header frame having opposite sides and a floor extending between opposite sides; a transverse auger extending between the opposite sides above the floor for moving crop material laterally along the floor; a plurality of generally fore and aft extending divider members mounted on the frame and defining a plurality of generally fore and aft passageways between adjacent divider members, each passageway being adapted to receive the crop material growing in a row as the machine advances; a crop gathering means supported on the frame adjacent each passageway and including a pair of endless flexible gathering elements respectively disposed on opposite sides of the passageway, each pair of gathering elements having opposite fore and aft extending inner runs moving rearwardly along the passageway to engage the crop material in the passage way and move it rearwardly to the auger, the rearward discharge end of each pair of endless flexible gathering elements being disposed above and adjacent to the forward end of the floor and below the auger; cutting means below and adjacent the forward intake ends of each pair of gathering elements for severing the crop material from the field as it is engaged by the gathering elements; and an upper stalk control structure mounted on the header frame and including a transverse member disposed forwardly of and above the auger and having opposite ends spaced inwardly of the opposite sides of the header, and a pair of forwardly diverging arms extending forwardly from the opposite ends of the transverse member generally above the outer divider members, the transverse member engaging the upper portion of tall upright crop material as it is moved rearwardly by the gathering elements before it is released by the gathering elements.

24. The invention defined in claim 23 wherein the lower edges of the endless flexible gathering elements extend generally tangentially from the outer periphery of the auger.

* * * * *